US012205011B2

(12) United States Patent
Qadeer et al.

(10) Patent No.: US 12,205,011 B2
(45) Date of Patent: *Jan. 21, 2025

(54) METHOD FOR AUTOMATIC HYBRID QUANTIZATION OF DEEP ARTIFICIAL NEURAL NETWORKS

(71) Applicant: Deep Vision Inc., Los Altos, CA (US)

(72) Inventors: Wajahat Qadeer, Campbell, CA (US);
Rehan Hameed, Palo Alto, CA (US);
Satyanarayana Raju Uppalapati, Hyderabad (IN); Abhilash Bharath Ghanore, Hyderabad (IN);
Kasanagottu Sai Ram, Hyderabad (IN)

(73) Assignee: Deep Vision Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/232,233

(22) Filed: Aug. 9, 2023

(65) Prior Publication Data
US 2023/0385645 A1 Nov. 30, 2023

Related U.S. Application Data

(63) Continuation of application No. 17/112,889, filed on Dec. 4, 2020, now Pat. No. 11,763,158.
(Continued)

(51) Int. Cl.
*G06N 3/0495* (2023.01)
*G06F 17/18* (2006.01)
(Continued)

(52) U.S. Cl.
CPC .......... *G06N 3/0495* (2023.01); *G06F 17/18* (2013.01); *G06N 3/04* (2013.01); *G06N 3/048* (2023.01); *G06N 3/045* (2023.01)

(58) Field of Classification Search
CPC ........ G06N 3/0495; G06N 3/04; G06N 3/048; G06N 3/045; G06F 17/18
See application file for complete search history.

(56) References Cited

U.S. PATENT DOCUMENTS

| 11,763,158 | B2* | 9/2023 | Qadeer | G06F 17/18 |
| | | | | 706/15 |
| 2019/0227893 | A1* | 7/2019 | Imber | G06N 3/063 |

(Continued)

OTHER PUBLICATIONS

Lin et al., "Fixed Point Quantization of Deep Convolutional Networks" Proceedings of the 33rd International Conference on Machine Learning, PMLR 48:2849-2858, 2016 (Year: 2016).*

(Continued)

*Primary Examiner* — John C Kuan
(74) *Attorney, Agent, or Firm* — Run8 Patent Group, LLC; Peter Miller; Brian T. Chew

(57) ABSTRACT

A method includes, for each floating-point layer in a set of floating-point layers: calculating a set of input activations and a set of output activations of the floating-point layer; converting the floating-point layer to a low-bit-width layer; calculating a set of low-bit-width output activations based on the set of input activations; and calculating a per-layer deviation statistic of the low-bit-width layer. The method also includes ordering the set of low-bit-width layers based on the per-layer deviation statistic of each low-bit-width layer. The method additionally includes, while a loss-of-accuracy threshold exceeds the accuracy of the quantized network: converting a floating-point layer represented by the low-bit-width layer to a high-bit-width layer; replacing the low-bit-width layer with the high-bit-width layer in the quantized network; updating the accuracy of the quantized network; and, in response to the accuracy of the quantized network exceeding the loss-of-accuracy threshold, returning the quantized network.

20 Claims, 2 Drawing Sheets

Related U.S. Application Data

(60) Provisional application No. 62/943,565, filed on Dec. 4, 2019.

(51) Int. Cl.
 *G06N 3/04* (2023.01)
 *G06N 3/048* (2023.01)
 *G06N 3/045* (2023.01)

(56) References Cited

U.S. PATENT DOCUMENTS

2019/0228284 A1* 7/2019 Holland ............... G06N 3/047
2020/0264876 A1* 8/2020 Lo ....................... G06N 3/084

OTHER PUBLICATIONS

Lo et al., "Fixed-Point Implementation of Convolutional Neural Networks for Image Classification" 2018 International Conference on Advanced Technologies for Communications (Year: 2018).*

* cited by examiner

METHOD FOR AUTOMATIC HYBRID QUANTIZATION OF DEEP ARTIFICIAL NEURAL NETWORKS

CROSS-REFERENCE TO RELATED APPLICATIONS

This application is a continuation of U.S. patent application Ser. No. 17/112,889, filed on 4 Dec. 2020, which claims the benefit of U.S. Provisional Application No. 62/943,565, filed on 4 Dec. 2019, each of which is incorporated in its entirety by this reference.

TECHNICAL FIELD

This invention relates generally to the field of quantization and more specifically to a new and useful method for quantizing an artificial neural network in the field of edge evaluation of artificial neural networks.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
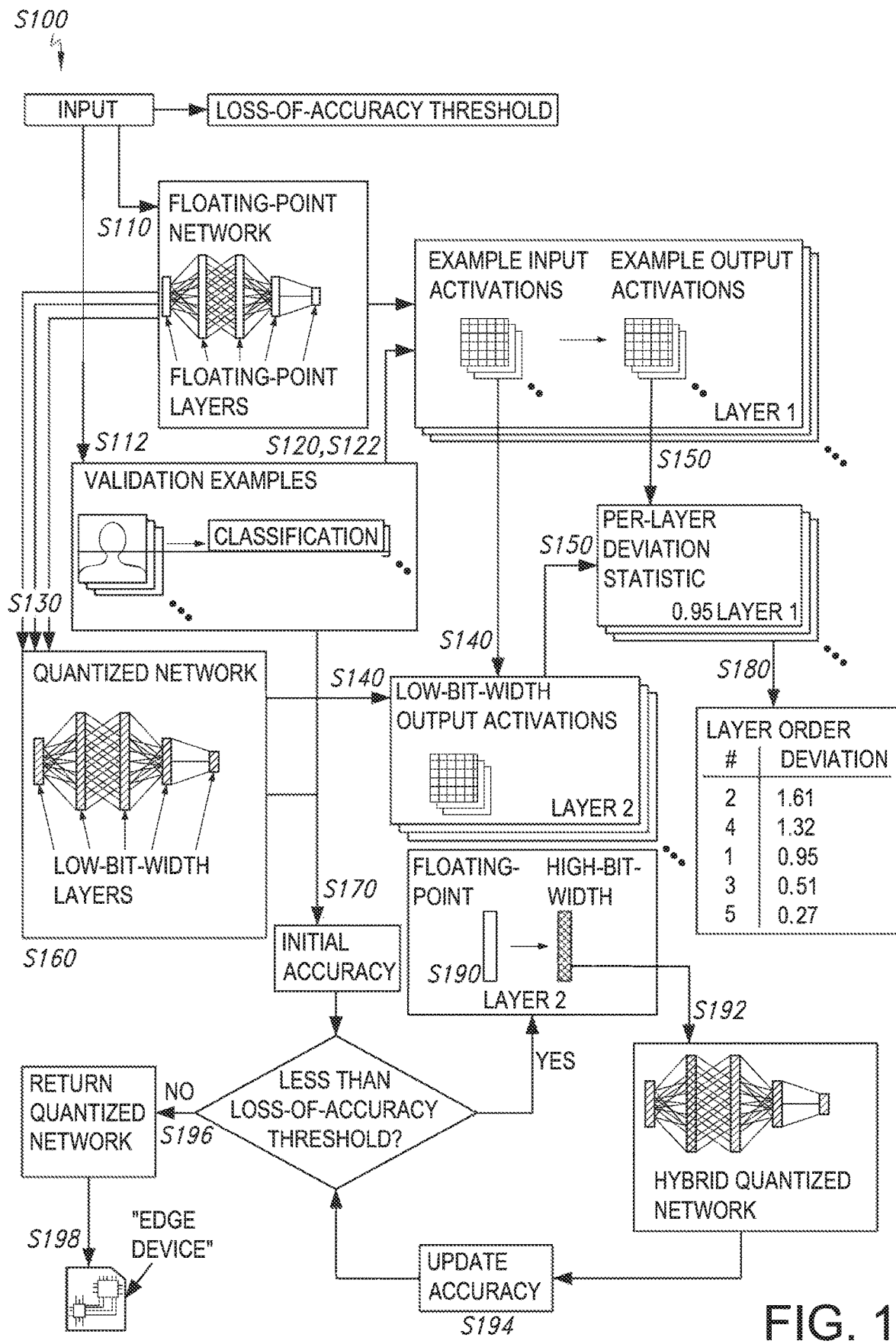
FIG. 1 is a flowchart representation of a method.

As shown in FIG. 1, a method S100 for quantizing artificial neural networks includes: accessing a floating-point network including a set of floating-point layers in Block S110; and accessing a set of validation examples for the floating-point network in Block S112. The method S100 also includes, for each floating-point layer in the set of floating-point layers: calculating a set of example input activations of the floating-point layer and a set of example output activations of the floating-point layer based on the set of validation examples in Blocks S120 and S122; converting the floating-point layer to a low-bit-width layer in a set of low-bit-width layers in Block S130; calculating a set of low-bit-width output activations of the low-bit-width layer based on the set of example input activations in Block S140; and calculating a per-layer deviation statistic of the low-bit-width layer based on the set of low-bit-width output activations of the low-bit-width layer and the set of example output activations of the floating-point layer in Block S150. The method S100 additionally includes: generating a quantized network representing the floating-point network and including the set of low-bit-width layers in Block S160; calculating an accuracy of the quantized network based on the set of validation examples in Block S170; and ordering the set of low-bit-width layers based on the per-layer deviation statistic of each low-bit-width layer in the set of low-bit-width layers to generate an ordered set of low-bit-width layers in Block S180. The method S100 further includes, while a loss-of-accuracy threshold exceeds the accuracy of the quantized network, sequentially, in the ordered set of low-bit-width layers: converting a floating-point layer represented by the low-bit-width layer to a high-bit-width layer in Block S190; replacing the low-bit-width layer with the high-bit-width layer in the quantized network in Block S192; updating the accuracy of the quantized network based on the set of validation examples in Block S194; and, in response to the accuracy of the quantized network exceeding the loss-of-accuracy threshold, returning the quantized network in Block S196.

As shown in FIG. 1, one variation of the method S100 for quantizing artificial neural networks includes: accessing a floating-point network including a set of floating-point layers in Block S110; and accessing a set of validation examples for the floating-point network in Block S112. This variation of the method S100 also includes, for each floating-point layer in the set of floating-point layers: calculating a set of example input activations of the floating-point layer and a set of example output activations of the floating-point layer based on the set of validation examples in Blocks S120 and S122; converting the floating-point layer to an eight-bit layer in a set of eight-bit layers in Block S130; calculating a set of eight-bit output activations of the eight-bit layer based on the set of example input activations in Block S140; and calculating a per-layer deviation statistic of the eight-bit layer based on the eight-bit output activations of the eight-bit layer and the set of example output activations of the floating-point layer in Block S150. This variation of the method S100 additionally includes: generating a quantized network representing the floating-point network and including the set of eight-bit layers in Block S16o; calculating an accuracy of the quantized network based on the set of validation examples in Block S170; and ordering the set of eight-bit layers based on the per-layer deviation statistic of each eight-bit layer in the set of eight-bit layers to generate an ordered set of eight-bit layers in Block S180. This variation of the method S100 further includes, while a loss-of-accuracy threshold exceeds the accuracy of the quantized network, sequentially, in the ordered set of eight-bit layers: converting a floating-point layer represented by the eight-bit layer to a sixteen-bit layer in Block S190; replacing the eight-bit layer with the sixteen-bit layer in the quantized network in Block S192; updating the accuracy of the quantized network based on the set of validation examples in Block S194; and, in response to the accuracy of the quantized network exceeding the loss-of-accuracy threshold, loading the quantized network onto an edge device in Block S198.

As shown in FIG. 1, one variation of the method S100 for quantizing artificial neural networks includes: accessing a floating-point network including a set of floating-point layers in Block S110; and accessing a set of validation examples for the floating-point network in Block S112. This variation of the method S100 also includes, for each floating-point layer in the set of floating-point layers: calculating a set of example input activations of the floating-point layer based on the set of validation examples and a preceding subset of floating-point layers in the floating-point network in Block S120; calculating a set of example output activations of the floating-point layer based on the set of example input activations of the floating point layer in Block S122; converting the floating-point layer to a low-bit-width layer in a set of low-bit-width layers in Block S130; calculating a set of low-bit-width output activations of the low-bit-width layer based on the set of example input activations in Block S140; and calculating a per-layer deviation statistic of the low-bit-width layer based on the set of low-bit-width output activations of the low-bit-width layer and the set of example output activations of the floating-point layer in Block S150. This variation of the method S100 additionally includes: generating a quantized network representing the floating-point network and including the set of low-bit-width layers in Block S16o; and calculating an accuracy of the quantized network based on the set of validation examples in Block S170. This variation of the method S100 further includes, while a loss-of-accuracy threshold exceeds the accuracy of the quantized network, sequentially, from a greatest-deviating low-bit-width layer in the set of low-bit-width layers toward a least-deviating low-bit-width layer in the set of low-bit-width layers: converting a floating-point layer represented by the low-bit-width layer to a high-bit-width layer in Block S19o; replacing the low-bit-width layer with the high-bit-width layer in the quantized network in Block S192; updating the accuracy of the quantized network based on the set of validation examples in Block S194; and, in response to the accuracy of the quantized network exceeding the loss-of-accuracy threshold, returning the quantized network in Block S196.

2. Applications

Generally, a computer system (hereinafter "the system"), which can include a single computational device or multiple computational devices (e.g., servers) connected over the internet, executes Blocks of the method S100 to quantize artificial neural networks (hereinafter "networks") such that the quantized network is executable on specialized hardware at edge devices with limited memory and/or power supply. More specifically, the system can: access an input network represented in floating-point (hereinafter "a floating-point network"); quantize the floating-point network to a low-bit-width quantized network; calculate a low-bit-width layer activation for each low-bit-width layer in the quantized network; calculate a per-layer deviation statistic for each low-bit-width layer based on the low-bit-width activations and corresponding floating-point layer activations of the floating-point network; order each layer of the quantized network based on these per-layer deviation statistics; and iteratively (in the sorted order) increase the bit-width of each successive quantized layer until the quantized network satisfies a loss-of-accuracy threshold specified by a user. Therefore, the system generates a hybrid quantized network characterized by a select set of layers represented at a high bit-width (e.g., sixteen-bit fixed-point), while most layers of the network are represented at a low-bit-width (e.g., eight-bit fixed-point). Thus, the system greatly reduces the storage footprint occupied by a floating-point network, thereby improving performance of the network when executed on specialized hardware, without sacrificing the accuracy of the network in excess of a specified loss-of-accuracy threshold.

Generally, the system receives floating-point networks represented as a set of layers, wherein each layer includes a set of pretrained weights and/or biases represented as floating-point numbers. The system can execute Blocks of the method S100 on artificial neural networks including convolutional neural networks (hereinafter "CNNs"), recurrent neural networks (hereinafter "RNNs") including long short-term memory networks (hereinafter "LSTMs"), or any other type of artificial neural network. Additionally, the system can be compatible with any representation, format, or framework for artificial neural networks.

The system can receive, from a user, a set of validation examples and an accuracy measure that indicates the accuracy of the floating-point network over the set of validation examples. Additionally, the system can receive, from the user, a loss-of-accuracy threshold indicating an acceptable amount of accuracy loss for a quantized version of the floating-point network.

Once the system has received this set of data for a floating-point network, the system can convert each set of floating-point weights for each floating-point layer of the floating-point network in a set of low-bit-width weights. Therefore, the quantized network initially includes a set of low-bit-width layers, wherein each low-bit-width layer includes a set of weights represented as a low-bit-width fixed-point number (e.g., an eight-bit fixed-point number). Once the system generates this fully quantized network, the system can selectively increase the bit-width (e.g., to sixteen-bit fixed-point numbers), and therefore resolution, of specific low-bit-width layers on a per-layer basis within the quantized network until this hybrid quantized network satisfies the user-provided loss-of-accuracy threshold.

However, because the impact of an individual layer on the accuracy of the network is frequently unknown, the system first identifies candidate layers for conversion to a higher bit-width that may be more likely to negatively impact the accuracy of the quantized network if maintained in the quantized network at a low-bit-width. In order to characterize each layer, the system can calculate a set of example input activations for each floating-point layer and a set of example output activations for each floating-point layer by executing the floating-point network on the set of validation examples and recording the resulting input activations and output activations for each floating-point layer. The system can then feed each example input activation of a particular floating-point layer into a corresponding low-bit-width layer and measure the deviation between the output activation of the low-bit-width layer (hereinafter "a low-bit-width activation of the low-bit-width layer") and the example output activation of the floating-point layer. The system can calculate these per-layer deviations for each validation example and calculate a summary per-layer deviation statistic to quantify these deviations over the set of validation examples. Once the system calculates the per-layer deviation statistic for each low-bit-width layer in the quantized network, the system can order the low-bit-width layers from the layer characterized by the greatest per-layer deviation statistic to the layer characterized by the lowest per-layer deviation statistic.

The system can iterate through these ordered low-bit-width layers starting with the low-bit-width layer with the greatest per-layer deviation from its corresponding floating-point layer. For each iteration, the system replaces the low-bit-width layer with a high-bit-width layer to increase the bit-width of the low-bit-width layer (e.g., from eight-bit to sixteen-bit). The system can then test the accuracy of the network with the modified quantized network by executing the network on each of the validation examples and calculating the accuracy measure based on the results. The system continues this iterative process until the accuracy of this "hybrid" quantized network (i.e. a network containing layers quantized at low-bit-width and high bit-width) satisfies the loss-of-accuracy threshold provided by the user.

3. Quantizer Inputs

Generally, the system receives and/or accesses a floating-point network uploaded by a user of the system. However, the system also receives validation examples, an accuracy measure, and a loss-of-accuracy threshold for the floating-point network in order to execute Blocks of the method S100. More specifically, the system can provide an input interface and/or API with, which a user can provide the floating-point network, the set of validation examples, the accuracy measure, and/or the loss-of-accuracy threshold. Details of each of these input elements are further described below.

3.1 Floating-Point Network

Generally, the system can access a floating-point network including a set of floating-point layers in Block S110. More specifically, the system accesses a floating-point network comprising a set of floating-point layers, each floating-point layer comprising a set of floating-point weights. Additionally, the system can receive a floating-point network input by a user or user device, which may be defined via any known deep-learning software platform (e.g., CAFFE, TENSORFLOW, TORCH) that represents each floating-point layer and the set of weights corresponding to each floating-point layer. Additionally, the system can convert the floating-point network to a preferred format from any supported format.

In one implementation, the system can access a floating-point network that also defines the relationship between the floating-point layers of the floating-point network and/or the types of layers in the network. For example, the system can access a floating-point network that defines an input layer, an output layer, convolutional layers, pooling layers, and/or fully connected layers. Additionally, the system can access a floating-point network with each layer represented as an array, a matrix, or a tensor depending on the type of layer and the application of the floating-point network.

In another implementation, the system can access a floating-point network that defines additional characteristics of each layer including a number of output channels and/or input-channels of the layer, the position of the layer within the network (i.e., the order of the layer within the floating-point network), and/or whether the layer is associated with a batch normalization or scaling layer. Thus, the system can rank low-bit-width layers for conversion to a high bit-width based on intrinsic characteristics of the layer within the network.

In yet another implementation, the system can fuse convolutional layers with corresponding batch normalization layers and scaling layers by merging the batch normalization layer and the scaling layer into the convolutional layer. Thus, the system can execute only a single quantization of the fused layer instead of individually quantizing the batch normalization layer and scaling layer.

However, the system can access and/or quantize any type of artificial neural network represented according to any format.

3.2 Validation Examples

Generally, the system can access a set of validation examples with which to evaluate various quantized versions of the floating-point network in Block S112. Each validation example in the set of validation examples defines an input (e.g., an image, an input vector) and a corresponding expected output to the floating-point network (e.g., a classification, an output vector). The output of a validation example can define an expected output of the floating-point network in any way. For example, the system can receive a validation example defining an output in terms of the result of a classification of the network. In another example, the system can receive a validation example that defines an output vector, matrix, or tensor as opposed to just a classification. Thus, the system can: execute versions of the quantized network; and compare resultant output vectors, output matrices, or output tensors to the vectors, matrices, or tensors of the validation example in order to quantify accuracy loss between various versions of the quantized network and the floating-point network.

3.3 Accuracy Measure

Generally, the system can a designation of an accuracy measure in association with the floating-point network. More specifically, the system can enable the user (e.g., via an input interface, programmatically via an API) to define a statistical measure with which to define the accuracy of the network over the set of validation examples. The system can receive and execute an accuracy measure defined as the proportion of correct classifications made by the network over the set of validation examples. For example, the system can calculate the accuracy of a quantized network as 93%, if 93% of the classifications made over the set of validation examples are correct.

Additionally or alternatively, the system can receive and execute a more complex accuracy measure defined as a statistical similarity (between the output vectors or matrices/tensors) of the quantized network and the expected output vectors (or matrices/tensors) provided in the set of validation examples. The system can, therefore, receive and execute accuracy measures such as cosine similarity, Euclidian distance, or Manhattan distance. Furthermore, for floating-point networks that output images, the system can receive and implement accuracy measures that calculate the similarity between output images and expected images.

However, the system can receive and execute any accuracy measure defined by a user.

3.4 Loss-of-Accuracy Threshold

Generally, the system can access or receive as input from a user a loss-of-accuracy threshold in association with a floating-point network. The loss-of-accuracy threshold can define an accuracy (as a value of the accuracy measure), a proportion of an original accuracy of the floating-point network that is desired for the quantized network, or an accuracy interval around the original accuracy of the floating-point network. For example, the user may define the loss-of-accuracy threshold at the absolute value of 98% for a network that had an initial accuracy (before quantization) of 100%. Alternatively, the user may define a loss of accuracy threshold indicating that the user desires the quantized network to be characterized by an accuracy of greater than 98% of the accuracy of the floating-point network. In yet another alternative, the user may define an interval of 2% indicating that the quantized network cannot lose more than 2% of the original accuracy of the floating-point network.

For more complex accuracy measures, the system can receive loss-of-accuracy thresholds specific to the accuracy measure of the floating-point network such as multidimensional loss-of-accuracy thresholds.

Therefore, the system can receive a loss-of-accuracy threshold defined by the user as a target for the accuracy of the hybrid quantized network. Thus, the system, when iteratively executing Blocks of the method S100, aims to generate a hybrid quantized network that exhibits an accuracy measure that exceeds (or satisfies) the loss-of-accuracy threshold provided by the user.

4. Per-Layer Floating-Point Activations

Generally, the system calculates a set of example input activations of the floating-point layer and a set of example output activations of the floating-point layer based on the set of validation examples and records these activations in association with the layer, in Blocks S120 and S122, in order to evaluate differences between the quantized network and the floating-point network on a per-layer basis. More specifically, the system can, for each of the set of validation examples, calculate floating-point activations for each of the set of input layers by executing the floating-point network over each of the validation examples and recording the activation of each layer during execution of the floating-point network. Thus, the system records the input and output activations of each floating-point layer in the floating-point network for each validation example. Therefore, by calculating these input and output activations for of the set of validation examples, the system generates a set of per-layer validation inputs and per-layer validation outputs with which to evaluate the output activations of corresponding low-bit-width layers of the quantized network.

For example, the system can evaluate the floating-point network on a first validation example. The system can then record the output activation of a second layer that feeds into a third layer as its input activations. The system can then subsequently record the output activations of the third layer responsive to these input activations. Therefore, for this first validation example, the system can record a validation input (i.e. the activations of the second layer) and a validation output (i.e. the activations of the third layer) for the third floating-point layer of the floating-point network.

The system can record these input and output activations for each layer in the floating-point network and for each validation in the set of validation examples. Subsequently, the system can, therefore, test each layer of the quantized network to characterize how quantization has affected the output activations of the low-bit-width layers when compared to the floating-point activations of the corresponding floating-point layers.

5. Initial Low-Bit-Width Quantization

Generally, the system can, for each floating-point layer in the floating-point network, convert the floating-point layer to a low-bit-width layer in a set of low-bit-width layers, in Block S130, thereby generating a quantized network representing the floating-point network that includes the set of low-bit-width layers in Block S16o. More specifically, the system can: convert the floating-point network to a quantized network including a set of low-bit-width layers, each low-bit-width layer including a set of low-bit-width weights representing the set of floating-point weights of a corresponding floating-point layer in the floating-point network. Thus, the system initially quantizes the floating-point network into an entirely low-bit-width network, which provides substantially improved performance (e.g., inferences per-second, memory footprint) over a floating-point network when executed on application specific hardware or on any device with stringent power requirements or storage space. However, while improving performance of the network on application specific hardware, the entirely low-bit-width network generally suffers a significant accuracy loss when compared to floating-point network. Therefore, in successive Blocks of the method S100, the system improves the accuracy of the quantized network by selectively increasing the bit-width of specific layers within the network. In one example, the system can quantize weights of the floating-point network using eight-bit fixed-point representation.

When quantizing a layer of the floating-point network, the system can quantize the set of floating-point weights of the floating-point layer, thereby converting each floating-point weight to a low-bit-width fixed-point weight. Additionally or alternatively, the system can designate the bit-width of the set of output activations of a layer. For example, the system can, by default, designate a bit-width of eight for the set of output activations of each layer in the network. However, in this example, the system can selectively designate a higher bit-width of sixteen for select layers of the quantized network, as is further described below.

In order to quantize a set of floating-point weights (e.g., a set of floating-point weights of a layer, a set of floating-point weights of an output channel within a layer, a set of weights of an input channel of a layer), the system calculates, over the set of floating-point weights, weight statistics such as the minimum weight value in the set of floating-point weights, the maximum weight value in the set of floating-point weights, the mean weight value in the set of floating-point weights, and/or other statistics characterizing the distribution of the set of floating-point weights. Based on these weight statistics, the system can calculate a low-bit-width Q-format representation for the set of floating-point weights and/or a scaling factor for the set of floating-point weights in order to best represent these floating-point weights as low-bit-width fixed-point weights. For example, the system can convert a set of floating-point weights to Q7 fixed-point format (indicating a single integer bit and seven fractional bits. Alternatively, the system can convert a set of floating-point weights to a signed Q-format, such as QS2.5 fixed-point format (indicating a sign bit, two integer bits, and 5 fractional bits). In another alternative, the system can also calculate a scaling factor for the set of fixed-point weights in order to scale the fixed-point representation to cover the range of floating-point values in the set of floating-point weights.

Likewise, the system can calculate a Q-format representation for the set of floating-point output activations of a floating-point layer, by calculating activation statistics for the floating-point layer. In one implementation, the system can aggregate output activations generated by a floating-point layer across the set of validation examples of the floating-point network. The system can calculate activation statistics such as the minimum activation value of the set floating-point output activations, the maximum activation value of the set of floating-point output activations, the mean activation value in the set of floating-point output activations, and/or other statistics characterizing the distribution of floating-point output activations of a floating-point layer.

In one implementation, the system can convert each floating-point layer to a low-bit-width layer represented in Q-format fixed-point notation specifying a number of integer bits and a number of fractional bits. In this implementation, when converting a floating-point layer to a fixed-point layer, the system can calculate distinct a Q-format designation for the weights of the layer, for the bias of the layer, and/or for the output activations of the layer. More specifically, the system can: convert a set of floating-point weights of the floating-point layer to a set of Q-format fixed-point weights of the low-bit-width layer; and convert a bias of the floating-point layer to a Q-format fixed-point bias of the low-bit-width layer.

In another implementation, upon designating a Q-format representation for a set of output activations, the system can perform saturation checks to identify a proportion of the activations above a maximum representable value and can adjust Q-format representation and/or the scaling factor for the set of output activations based on the saturation check.

Generally, for a two-dimensional convolutional layer of a floating-point network, the set of floating-point weights of the floating-point layer are arranged in a four-dimensional tensor including a filter width dimension, a filter height dimension, a number of output channels, and a number of input channels. Because each output channel is associated with a distinct distribution of floating-point weight values and floating-point activations values, which may differ from other output channels within the same layer, in one implementation, the system can separately quantize output channels (i.e., the weights and/or activations corresponding to each output channel) within the same layer of the floating-point network in order to further increase the accuracy of the network at the expense of increased overhead for a processor executing the quantized network. For example, the system can: convert a first set of floating-point weights corresponding to a first output channel of a floating-point layer to a first Q-format fixed-point representation; and convert a second set of floating-point weights corresponding to a second output channel of the floating-point layer to a second Q-format fixed-point representation. Likewise, the system can: designate a first Q-format for a first set output activations corresponding to a first output channel of a floating-point layer; and designate a second Q-format for a second set of output activations corresponding to a second output channel of the floating-point layer. Thus, in this implementation, the system can separately quantize individual output channels within the same quantized layer in order to further improve accuracy of the quantized network, even at the initially low bit-width.

Additionally, the system can: calculate an accuracy for the low-bit-width quantized network and, in response to the accuracy of the quantized network exceeding the loss-of-accuracy threshold, the system can return the quantized network as the quantized version of the floating-point network. Thus, the system can detect whether the accuracy of the initial low-bit-width quantized network exceeds the loss-of-accuracy prior to the iterative hybrid quantization Blocks of the method S100.

6. Per-Layer Low-Bit-Width Activations

Figure 2:
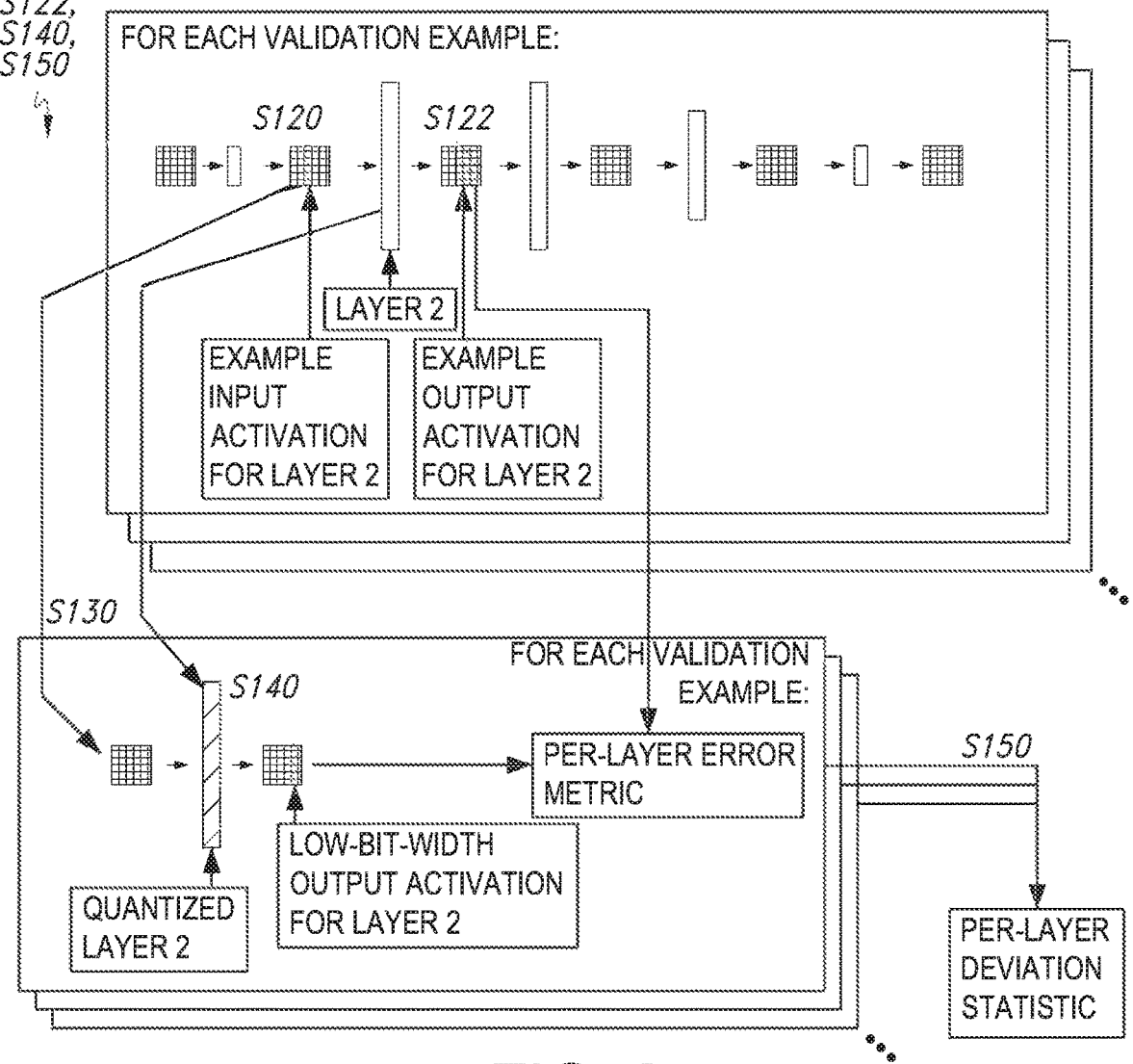
FIG. 2 is a flowchart representation of the method.

As shown in FIG. 2, once the system has quantized the floating-point network to generate a low-bit-width quantized network, the system can calculate a set of low-bit-width activations for each low-bit-width layer based on the previously calculated floating-point activations for a corresponding prior layer. More specifically, the system can: calculate a set of low-bit-width output activations of the low-bit-width layer based on the set of example input activations in Block S140. Therefore, the system can utilize the floating-point activations of a prior corresponding layer as an input for each low-bit-width layer and compare the output activation produced by the low-bit-width layer to the previously calculated output activation of the floating-point layer for each validation examples. For example, to calculate the per-layer low-bit-width activation for a third low-bit-width layer and for a first validation example, the system can first calculate the floating-point activation of the second floating point layer and the output activation of the third floating point layer of the floating-point network (as described above). The system can then input the output activation of the second floating point layer into the third low-bit-width layer to generate an output activation of the quantized version of the third layer. Therefore, the system can individually characterize each low-bit-width layer for its similarity to the corresponding layer in the unquantized floating-point network.

In the above-described manner, the system can calculate a set of low-bit-width activations, wherein each activation corresponds to a validation example in the set of validation examples. The system can then calculate deviation statistics for each low-bit-width layer in order to prioritize layers for conversion to a higher bit-width in order to improve the accuracy of a resulting hybrid quantized network in comparison to the initial low-bit-width quantized network.

7. Layer Priority Calculation

In one variation, the system can calculate a layer priority for each layer of the floating-point network that represents an estimated contribution of the layer to the accuracy of the whole network. More specifically, the system can, for each floating-point layer in the floating-point network: convert the floating-point layer to a low-bit-width layer; calculate an accuracy of the floating-point network including the single low-bit-width layer based on the set of validation examples; and calculate a layer priority for the layer based on a deviation from the initial accuracy of the floating-point network. Thus, by successively converting individual layers from floating-point to a low bit-width and measuring the deviation of the network while only a single layer is quantized at a low bit-width, the system can estimate the effect that the quantization of an individual layer is likely to have on the accuracy of the whole network.

For example, in a network including 40 layers, the system can convert layer one to a low bit-width while maintaining layers two through 40 as floating-point layers. The system can then evaluate the accuracy of the network while layer one is quantized and measure the deviation in the accuracy of the network from the initial accuracy of the floating-point network. The system can then calculate a priority for layer one proportional to this deviation in the accuracy of the network.

8. Per-Layer Deviation Statistics

Generally, in Block S130, the system can calculate per-layer deviation statistics for each low-bit-width layer in the quantized network in order to characterize the deviation in the activation of this layer from the activation of the corresponding floating-point layer over the set of validation examples, which the system can utilize as a proxy for the effect of each layer on the loss-of-accuracy of the overall quantized network when compared to the floating-point network. More specifically, the system can, for each low-bit-width layer in the set of low-bit-width layers, calculate a per-layer deviation statistic of the low-bit-width layer based on the set of low-bit-width output activations of the low-bit-width layer and the set of example output activations of the floating-point layer in Block S150. Therefore, the system can identify candidate low-bit-width layers to convert to a higher bit-width that are more likely to result in a larger increase in the overall accuracy of the hybrid quantized network based on a discrepancy between the output activations of the low-bit-width layer when compared to the corresponding floating-point layer for the set of validation examples.

In one implementation, the system can calculate a normalized mean squared error of deviations between a set of low-bit-width activations of a low-bit-width layer and the set of input activations of the corresponding floating-point layer over the set of validation examples. More specifically, the system can: for each example output activation in the set of floating-point example output activations, calculate an error metric between a corresponding low-bit-width output activation in the set of low-bit-width output activations and the floating-point example output activation; and calculate the per-layer deviation statistic equal to a mean squared error of the error metric for each example output activation in the set of example output activations.

However, the system can calculate any per-layer deviation statistic that characterizes the differences between these two activations calculated in the above-described Blocks of the method S100.

9. Layer Sorting

Generally, the system can sort the low-bit-width layers of the low-bit-width quantized network based on the likelihood that these layers are reducing the overall accuracy of the quantized network by measuring their impact on the full network accuracy. More specifically, the system can order or rank the set of low-bit-width layers based on the per-layer deviation statistic of each low-bit-width layer in the set of low-bit-width layers to generate an ordered set of low-bit-width layers in Block S180. Thus, the system can define an order with which to iteratively convert low-bit-width layers into high-bit-width layers in order to increase the accuracy of the quantized network.

The system can operate on the assumption that the likelihood is correlated with the per-layer deviation statistics that the system has calculated for each layer of the quantized network in accordance with the above-described Blocks of the method S100. More specifically, the system can sort the set of low-bit-width layers to generate an ordered set of low-bit-width layers based on the per-layer deviation statistic of each low-bit-width layer, the ordered set of low-bit-width layers beginning with a highest deviating low-bit-width layer. Therefore, the system can generate a sorted set of low-bit-width layers, which are approximately ordered according to their likelihood of improving the accuracy of the quantized network upon conversion to a higher bit-width.

However, the system can also sort the set of low-bit-width layers based on other characteristics of these layers, such as the layer priority of each low-bit-width layer. In one implementation, the system can rank the set of low-bit-width layers based on the layer priority of each low-bit-width layer. The system can then select a subset (e.g., a first quartile, or a threshold percentile) of candidate low-bit-width layers from the set of low-bit-width layers based on the layer priority of these low-bit-width layers and order this subset of candidate low-bit-width layers based on the per-layer deviation of the candidate low-bit-width layers. Thus, the system can filter the set of low-bit-width layers into a set of candidate layers (e.g., based on the layer priority of each low-bit-width layer, the network position of each low-bit-width layer, the layer type of each low-bit-width layer, the saturation percentage of each low-bit-width layer).

In one implementation, the system can order or rank the set of low-bit-width layers, based on the per-layer deviation statistic of each low-bit-width layer in the set of low-bit-width layers and a network position of each low-bit-width layer in the set of low-bit-width layers, to generate the ordered set of low-bit-width layers. In this implementation, the system can calculate a combined ranking metric that is a function of the layer position and the per-layer deviation statistic. For example, in this implementation, the system can increase the rank or select a low-bit-width layer for early inclusion in the ordered set of low-bit-width layers due to an early position of the low-bit-width layer in the quantized network despite the layer having a lower per-layer deviation statistic than later positioned low-bit-width layers in the quantized network. Additionally, in this implementation, the system can select a highest-deviating subset of the set of low-bit-width layers based on the per-layer deviation statistic of each low-bit-width layer in the set of low-bit-width layers; and order or rank the highest-deviating subset from an earliest network position to a latest network position based on the network position of each low-bit-width layer in the set of low-bit-width layers to generate the ordered set of low-bit-width layers. Thus, the system can first filter the set of low-bit-width layers based on the per-layer deviation statistic and then rank the filtered subset of low-bit-width layers based on the position of each low-bit-width layer in the quantized network.

In another implementation, the system can order or rank the set of low-bit-width layers, based on the per-layer deviation statistic of each low-bit-width layer in the set of low-bit-width layers and a layer type of each low-bit-width layer in the set of low-bit-width layers, to generate the ordered set of low-bit-width layers. For example, in this implementation, the system can rank convolutional low-bit-width layers higher in the ordered set of low-bit-width layers than pooling low-bit-width layers. Thus, if an administrator or user of the system determines that particular types of layers are contributing more to errors in the output of the quantized network, the system can prioritize this type of layer for conversion to a high-bit-width layer.

In yet another implementation, the system can select a subset of this ordered set of low-bit-width layers based on the per-layer deviation statistic of each low-bit-width layer in the set of low-bit-width layers (e.g., the top quartile of these low-bit-width layers) as a candidate set of low-bit-width layers to convert to the high bit-width. Thus, in this implementation, the system can filter the set of low-bit-width layers based on the per-layer deviation statistic of these layers and further rank the candidate set of low-bit-width layers based on another layer characteristic (e.g., layer position, layer type, saturation percentage). For example, the system can order the set of low-bit-width layers, based on the per-layer deviation statistic of each low-bit-width layer in the set of low-bit-width layers and a saturation proportion of each low-bit-width layer in the set of low-bit-width layers, to generate the ordered set of low-bit-width layers.

In yet another implementation, the system can sort the set of low-bit-width layers based on other characteristics of these layers in addition to the per-layer deviation statistic calculated for these layers. For example, the system can score each low-bit-width layer based on a weighted sum of layer characteristics such as the saturation percentage of the activations of the layer (i.e. the proportion of activations in a layer that are equal to the maximum represented value of the low-bit width quantization), the position of the layer relative to the input and the output of the network, the type of layer, or any other characteristic of the low-bit-width layer.

10. Iterative Bit-Width Conversion of Low-Bit-Width Layers

Generally, once the system has generated an ordered set of low-bit-width layers or an ordered subset of candidate low-bit-width layers that are generally characterized by a higher likelihood to affect the accuracy of the quantized network, the system can iterate through each of the low-bit-width layers in order to: convert each low-bit-width layer from a low-bit-width representation to a high bit-width representation; evaluate the hybrid quantized network resulting from this conversation over the set of validation examples in order to calculate an accuracy of this hybrid quantized network; and, in response to this accuracy satisfying the loss-of-accuracy threshold defined by the user, return the hybrid quantized network as an output to the user (e.g., by storing the hybrid quantized network at the system). More specifically, the system can initially calculate an accuracy of the low-bit-width quantized network based on the set of validation examples in Block S170. Subsequently, the system can, while a loss-of-accuracy threshold exceeds the accuracy of the quantized network, sequentially, in the ordered set of low-bit-width layers: convert a floating-point layer represented by the low-bit-width layer to a high-bit-width layer in Block S19o; replace the low-bit-width layer with the high-bit-width layer in the quantized network in Block S192; update the accuracy of the quantized network based on the set of validation examples in Block S194; and, in response to the accuracy of the quantized network exceeding the loss-of-accuracy threshold, return the quantized network in Block S196. Additionally or alternatively, the system can, in response to the accuracy of the quantized network exceeding the loss-of-accuracy threshold, load the quantized network onto an edge device in Block S198

Therefore, the system executes a while loop to iterate through each candidate low-bit-width layer, successively replacing these layers with a high-bit-width layer representing the same floating-point layer, thereby improving the accuracy of the hybrid quantized network in Blocks S19o and S192. Upon replacing a low-bit-width layer with a high-bit-width layer, the system can reevaluate the accuracy of the hybrid quantized network. Before initiating a subsequent iteration of the while loop, the system again checks the updated accuracy of the hybrid quantized network and continues iterating through candidate low-bit-width layers until the accuracy of the hybrid quantized network exceeds the loss-of-accuracy threshold.

In one implementation, the system converts eight-bit quantized weights to sixteen-bit quantized weights for each low-bit-width layer selected for conversion to a high-bit-width layer. In this implementation, the system accesses a floating-point layer corresponding to the candidate low-bit-width layer (i.e., the floating layer occupying the same location in the floating-point network) and quantizes the floating-point layer into a higher bit-width fix-point representation of the floating-point layer (i.e., a sixteen-bit fixed-point representation).

In another implementation, the system can: compare the accuracy of the hybrid quantized network in a latest iteration and compare this accuracy with the accuracy of the hybrid quantized network in a previous iteration; and, in response to detecting that the accuracy has decreased as a result of the conversion of the latest layer to a higher bit-width quantization, revert the latest layer to the low-bit-width quantization. Therefore, if the conversion of a low-bit-width layer of the quantized network to a high bit-width layer does not improve the accuracy of the quantized network, the system can revert this layer to the low-bit-width quantization.

In yet another implementation, the system can: convert a set of low-bit-width weights of a low-bit-width layer to a set of high-bit-width weights; calculate the accuracy of the quantized network; and in response to the accuracy of the network increasing by less than a threshold accuracy increase; designate a high-bit-width representation for the set of output activations of the layer. Thus, the system can separately convert the weights of a low-bit-width layer to a high-bit-width representation and increase the bit-width of the output activations of the layer.

10.1 Hybrid Quantized Network Performance Check

In one implementation, the system can also simulate the performance of the hybrid quantized network for each iteration of the above-described while loop for converting individual low-bit-width layers to high-bit-width layers. More specifically, the system can calculate a performance metric of the quantized network based on the set of validation examples; and, while the loss-of-accuracy threshold exceeds the accuracy of the quantized network, sequentially, in the ordered set of low-bit-width layers, update the performance metric of the quantized network based on the set of validation examples. Thus, the system can calculate the performance of the hybrid quantization within each iteration in addition to the accuracy of the hybrid quantized network.

In one implementation, the system simulates the performance of the network when implemented on application specific hardware or on standard CPU or GPU. Additionally or alternatively, the system can calculate the performance of the hybrid quantized network inferences per-second (or frames per-second in the case of an image processing network). By calculating the performance of the hybrid quantized network for each iteration of the above-described iterative process, the system can detect whether the performance of the network has degraded (e.g., due to the conversion of successive quantized layers to a higher bit-width) below a prespecified (e.g., by the user or an administrator of the system) performance threshold. In one implementation, in response to detecting that the performance of the hybrid quantized network has degraded below this threshold, the system can halt the iterative process at the current iteration and return the current version of the hybrid quantized network. Additionally, the system can report that the system is unable to generate a hybrid quantized network that exhibits both the desired accuracy characteristics and the desired performance characteristics specified by the user for a given piece of hardware. Thus, the system can, while the loss-of-accuracy threshold exceeds the accuracy of the quantized network and while the performance metric of the quantized network exceeds a performance metric threshold, sequentially, in the ordered set of low-bit-width layers: convert the floating-point layer represented by the low-bit-width layer to the high-bit-width layer; replace the low-bit-width layer with the high-bit-width layer in the quantized network; update the accuracy of the quantized network based on the set of validation examples; update the performance metric of the quantized network based on the set of validation examples; and, in response to the accuracy of the quantized network exceeding the loss-of-accuracy threshold, return the quantized network.

In another implementation, the system can track the accuracy and/or performance of the hybrid quantized network for each iteration of the above-described iterative process in order to present a report to the user (via the output interface further described below) of the performance versus accuracy trade-offs for various versions of the hybrid quantized network.

In order to calculate the performance metric of the hybrid quantized network, the system can simulate execution of the hybrid quantized metric and measure the inferences per-second achieved by the simulated hybrid quantized network. Additionally or alternatively, the system can measure a peak power consumption and or a total energy consumption per-inference of the simulated hybrid quantized network in order to calculate the peak power consumption and/or the total energy consumption of the hybrid quantized network respectively. In another alternative, the system can simulate the memory footprint of the hybrid quantized network in order to calculate the memory utilization of the hybrid quantized network during execution.

11. Hybrid Quantized Network Output Interface

In one implementation, the system can, upon returning the hybrid quantized network at the termination of the above-described iterative process, generate a report and/or render an interactive interface in order to communicate the characteristics of the resulting hybrid quantized network to the user. In one implementation, the system renders an interface or report representing the accuracy of the hybrid quantized network relative to the original floating-point network and the loss-of-accuracy threshold. Additionally or alternatively, the system can render an interface or report representing the performance of the hybrid quantized network relative to the original floating-point network and on hardware specified hardware and/or a range of potential hardware options.

In another implementation, the system can render an interactive interface that represents a range of hybrid quantized networks generated in the above-described iterative process, thereby demonstrating increases in accuracy relative to decreases in performance as the system increases the number of high bit-width layers in the hybrid quantized network. For example, the system can render a slider bar interface that, in response to a user input dragging the slider bar, indicates the proportion of layers quantized at the high bit-width in a hybrid quantized network, the accuracy of this hybrid quantized network, and the performance of this hybrid quantized network. More specifically, the system can render a plot of the accuracy of the quantized network and the performance metric of the quantized network for each replacement of a low-bit-width layer with a high-bit-width layer in the quantized network.

In yet another implementation, the system can render an interface representing the storage footprint of the hybrid quantized network in addition to other performance metrics of the hybrid quantized network when executed on particular hardware (e.g., selected by the user) such as the power requirements for executing the hybrid quantized network.

Furthermore, in response to the system failing to generate a hybrid quantized network that satisfies specified performance and accuracy requirements provided by the user, the system can prompt the user to relax these requirements in order to produce a network within the execution capabilities of the selected hardware and/or the predictive capabilities of the network in a quantized state.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for quantizing an artificial neural network, the method comprising:
   converting a set of floating-point layers in a floating-point network to a set of low-bit-width layers;
   for each low-bit-width layer in the set of low-bit-width layers:
     calculating a per-layer deviation statistic of the low-bit-width layer based on a mean squared error of a difference between an example output activation of a floating-point layer, in the set of floating-point layers, and a low-bit-width output activation of the low-bit-width layer; and
     sorting the low-bit-width layer in the set of low-bit-width layers based on the per-layer deviation statistic as a set of ordered low-bit-width layers;
   generating a quantized network representing the floating-point network and comprising the set of low-bit-width layers; and
   in response to an accuracy of the quantized network falling below a loss-of-accuracy threshold, sequentially, according to the set of ordered low-bit-width layers:
     converting a floating-point layer, represented by a low-bit-width layer in the set of ordered low-bit-width layers, to a high-bit-width layer; and
     replacing the low-bit-width layer with the high-bit-width layer in the quantized network.

2. The method of claim 1:
   further comprising:
     for each floating-point layer in the set of floating-point layers, calculating a set of example output activations of the floating-point layer based on a set of validation examples; and
     for each low-bit-width layer in the set of low-bit-width layers, calculating a set of low-bit-width output activations of the low-bit-width layer based on a set of example input activations; and
   wherein calculating the per-layer deviation statistic comprises calculating the per-layer deviation statistic of the low-bit-width layer based on a set of error metrics between the set of low-bit-width output activations of the low-bit-width layer and the set of example output activations of the floating-point layer.

3. The method of claim 2, further comprising calculating a set of example input activations based on the set of validation examples and a subset of floating-point layers in the set of floating-point layers.

4. The method of claim 1, wherein sorting the low-bit-width layer in the set of low-bit-width layers comprises sorting the low-bit-width layer in the set of low-bit-width layers, as the set of ordered low-bit-width layers, based on the per-layer deviation statistic and a layer type of the low-bit-width layer.

5. The method of claim 4, wherein sorting the low-bit-width layer in the set of low-bit-width layers comprises assigning a first low-bit-width layer, exhibiting a first layer type, a first rank in the set of ordered low-bit-width layers exceeding a second rank assigned to a second low-bit-width layer exhibiting a second layer type.

6. The method of claim 5, wherein sorting the low-bit-width layer in the set of low-bit-width layers comprises assigning the first low-bit-width layer, exhibiting the first layer type representing a convolutional low-bit-width layer, the first rank in the set of ordered low-bit-width layers exceeding the second rank assigned to the second low-bit-width layer exhibiting the second layer type representing a pooling low-bit-width layer.

7. The method of claim 1:
further comprising:
calculating a first accuracy of the floating-point network; and
for each floating-point layer in the set of floating point layers:
calculating a second accuracy of the floating-point network based on a low-bit-width layer, corresponding to the floating-point layer, and the set of floating point layers excluding the floating point layer; and
calculating a layer priority for the low-bit-width layer corresponding to the floating-point layer based on a difference between the second accuracy and the first accuracy; and
wherein sorting the low-bit-width layer in the set of low-bit-width layers comprises sorting the low-bit-width layer in the set of low-bit-width layers, as the set of ordered low-bit-width layers, based on the per-layer deviation statistic and the layer priority for the low-bit-width layer.

8. The method of claim 1:
wherein converting the set of floating-point layers comprises converting the set of floating-point layers to a set of eight-bit layers;
wherein generating the quantized network comprises generating the quantized network comprising the set of eight-bit layers;
wherein converting the floating-point layer comprises converting the floating-point layer, represented by an eight-bit layer in a set of ordered eight-bit layers, to a sixteen-bit layer; and
wherein replacing the low-bit-width layer comprises replacing the eight-bit layer with the sixteen-bit layer in the quantized network.

9. The method of claim 1, further comprising:
recalculating the accuracy of the quantized network as an updated accuracy; and
in response to the updated accuracy exceeding the loss-of-accuracy threshold, loading the quantized network onto an edge device.

10. The method of claim 1, further comprising:
recalculating the accuracy of the quantized network as an updated accuracy; and
in response to the updated accuracy exceeding the loss-of-accuracy threshold, returning the quantized network.

11. The method of claim 1, wherein converting the set of floating-point layers comprises converting a floating-point output channel to a low-bit-width output channel in a low-bit-width layer in the set of low-bit-width layers.

12. The method of claim 1, wherein converting the set of floating-point layers to the set of low-bit-width layers comprises converting a first floating-point layer to a first low-bit-width layer represented in Q-format fixed-point notation specifying:
a first quantity of integer bits; and
a second quantity of fractional bits.

13. The method of claim 12, wherein converting the first floating-point layer comprises:
converting a set of floating-point weights of the first floating-point layer to a set of Q-format fixed-point weights of the first low-bit-width layer;
converting a bias of the first floating-point layer to a Q-format fixed-point bias of the first low-bit-width layer; and
bit-shifting the set of Q-format fixed-point weights to match the Q-format fixed-point bias.

14. The method of claim 1:
further comprising calculating a performance metric of the quantized network based on a set of validation examples; and
wherein converting the floating-point layer comprises converting the floating-point layer, represented by the low-bit-width layer in the set of ordered low-bit-width layers, to the high-bit-width layer in response to:
the accuracy of the quantized network falling below the loss-of-accuracy threshold; and
the performance metric of the quantized network exceeding a performance metric threshold.

15. A method for quantizing an artificial neural network, the method comprising:
converting a set of floating-point layers in a floating-point network to a set of low-bit-width layers;
for each low-bit-width layer in the set of low-bit-width layers, calculating a per-layer deviation statistic, in a set of per-layer deviation statistics, of the low-bit-width layer based on a mean squared error of a difference between an example output activation of a floating-point layer, in the set of floating-point layers, and a low-bit-width output activation of the low-bit-width layer;
generating a quantized network representing the floating-point network and comprising the set of low-bit-width layers; and
in response to an accuracy of the quantized network falling below a loss-of-accuracy threshold:
converting a floating-point layer, represented by a first low-bit-width layer exhibiting a greatest per-layer deviation statistic in the set of per-layer deviation statistics, to a high-bit-width layer; and
replacing the first low-bit-width layer with the high-bit-width layer in the quantized network.

16. The method of claim 15, further comprising:
for each floating-point layer in the set of floating-point layers, calculating the example output activation of the floating-point layer based on a validation example; and
for each low-bit-width layer in the set of low-bit-width layers, calculating the low-bit-width output activation of the low-bit-width layer based on an example input activation.

17. The method of claim 15:
further comprising:
calculating a first accuracy of the floating-point network;

for each floating-point layer in the set of floating point layers:
    calculating a second accuracy of the floating-point network based on a low-bit-width layer, corresponding to the floating-point layer, and the set of floating point layers excluding the floating point layer; and
    calculating a layer priority for the low-bit-width layer corresponding to the floating-point layer based on a difference between the second accuracy and the first accuracy; and
for each low-bit-width layer in the set of low-bit-width layers, sorting the low-bit-width layer in the set of low-bit-width layers based on the per-layer deviation statistic of the low-bit-width layer and the layer priority for the low-bit-width layer as a set of ordered low-bit-width layers; and
wherein converting the floating-point layer comprises converting the floating-point layer, represented by the first low-bit-width layer in the set of ordered low-bit-width layers, to the high-bit-width layer.

18. The method of claim 15:
further comprising, for each low-bit-width layer in the set of low-bit-width layers, sorting the low-bit-width layer in the set of low-bit-width layers, as a set of ordered low-bit-width layers, based on the per-layer deviation statistic and a layer type of the low-bit-width layer; and
wherein converting the floating-point layer comprises converting the floating-point layer, represented by the first low-bit-width layer in the set of ordered low-bit-width layers, to the high-bit-width layer.

19. A method for quantizing an artificial neural network, the method comprising:
converting a set of floating-point layers in a floating-point network to a set of low-bit-width layers;
for each low-bit-width layer in the set of low-bit-width layers, calculating a per-layer deviation statistic, in a set of per-layer deviation statistics, of the low-bit-width layer based on a set of error metrics between a set of low-bit-width output activations of the low-bit-width layer and a set of example output activations of a floating-point layer, each error metric in the set of error metrics characterized by a difference between an example output activation in the set of example output activations and a corresponding low-bit-width output activation in the set of low-bit-width output activations, wherein the per-layer deviation statistic is calculated based on a mean squared error of the error metric for each example output activation in the set of example output activations;
generating a quantized network representing the floating-point network and comprising the set of low-bit-width layers; and
in response to an accuracy of the quantized network falling below a loss-of-accuracy threshold:
    converting a floating-point layer, represented by a low-bit-width layer exhibiting a greatest per-layer deviation statistic in the set of per-layer deviation statistics, to a high-bit-width layer; and
    replacing the low-bit-width layer with the high-bit-width layer in the quantized network.

20. The method of claim 19, wherein calculating the per-layer deviation statistic comprises:
for each example output activation in the set of example output activations, calculating an error metric between a corresponding eight-bit output activation, in the set of eight-bit output activations, and the example output activation.

* * * * *